March 8, 1938. N. MILLER ET AL 2,110,674
TEMPERATURE CONTROL DEVICE
Filed July 16, 1935
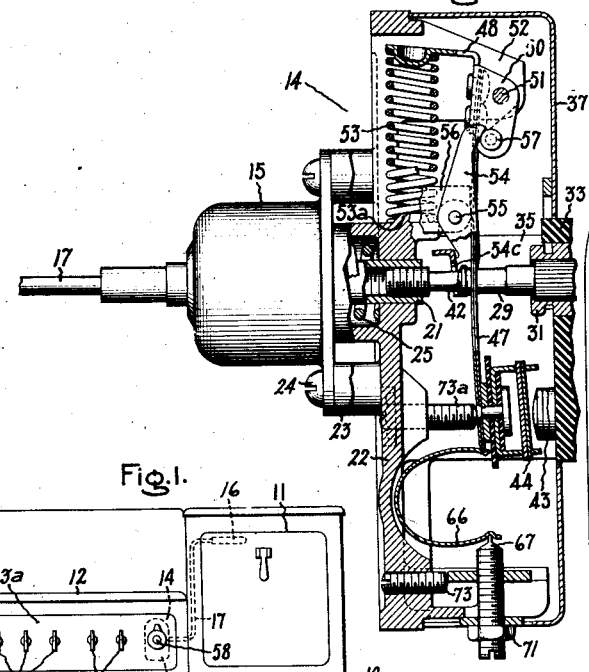
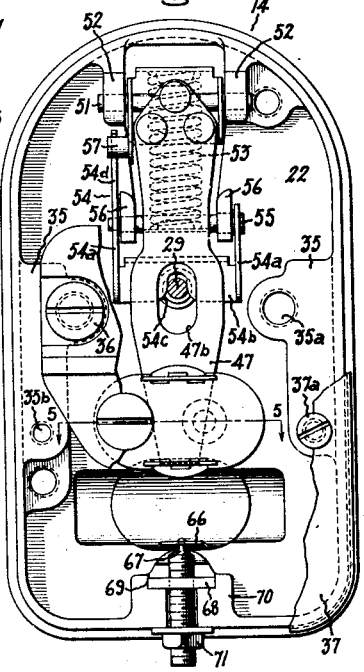
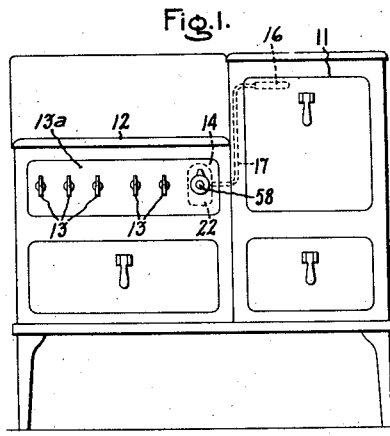
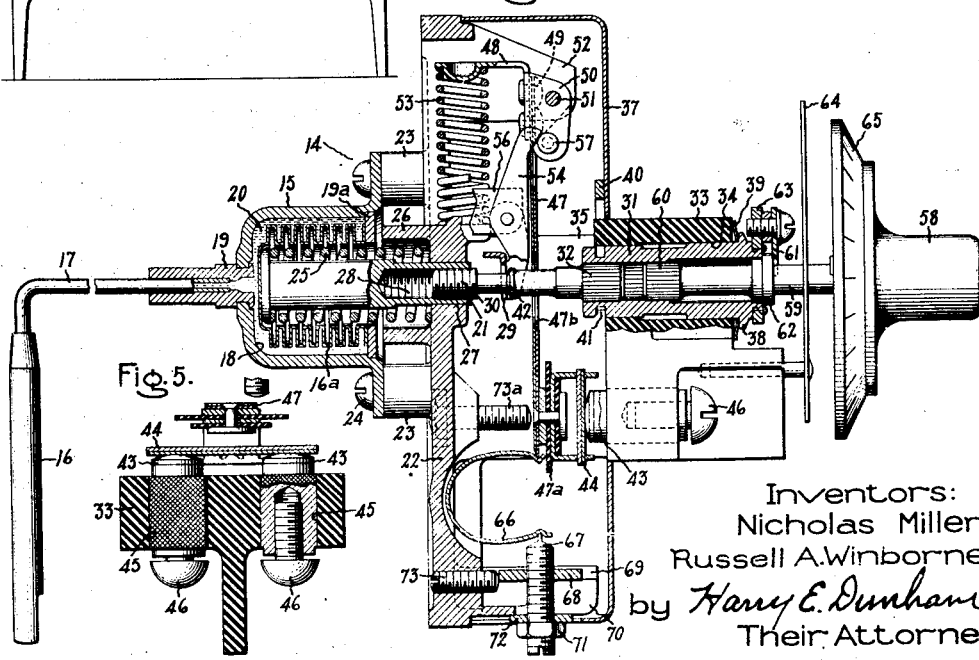
Inventors:
Nicholas Miller,
Russell A. Winborne,
by Harry E. Dunham
Their Attorney.

Patented Mar. 8, 1938

2,110,674

UNITED STATES PATENT OFFICE 2,110,674

TEMPERATURE CONTROL DEVICE

Nicholas Miller, La Grange, and Russell A. Winborne, Oak Park, Ill., assignors to Edison General Electric Appliance Company, Chicago, Ill., a corporation of New York Application July 16, 1935, Serial No. 31,596

17 Claims. (Cl. 200—140)

This invention relates to temperature control devices and it has for its object the provision of an improved device of this character.

Although not limited thereto, this invention relates more specifically to means for automatically opening and closing an electric circuit in response to temperature changes, such as the heating circuit, or a controlling circuit for the heating circuit, of an electric oven, in order to maintain a substantially constant predetermined temperature. It is to be understood, however, that this invention is not limited in its application to the control of switches, but may be used in connection with other controlling devices, such as a fuel control valve.

This invention contemplates the provision of an improved temperature control device which is simple, reliable, and efficient in its operation, and further, one which is not adversely affected by changes in ambient temperature.

In accordance with this invention, in one form thereof, a control arm, such as a switch arm, is arranged to be moved between a plurality of controlling positions. A spring is provided for generating a force to move the arm to one of the controlling positions and to oppose movement of the arm to another controlling position. A temperature control device is provided for moving the control arm to its other controlling position and to control its operation in conjunction with the spring. Preferably, the control device will be of the expansible and contractible bellows type which will be connected to the control arm through a suitable lever mechanism. The operation of the bellows is controlled by means of a temperature responsive fluid, which is placed in a closed system with the bellows and a bulb which is located in the zone whose temperature is to be controlled, such as the oven of an electric range.

The bellows is located at some point outside of the heated zone, and in order to compensate for changes in its operation that might be effected by changes in the ambient temperature, the control arm itself is caused to respond to ambient temperature so as to compensate for changes in the position of the bellows due to ambient temperature variations.

For a more complete understanding of this invention, reference should be had to the accompanying drawing, in which Fig. 1 is an elevation of an electric range provided with temperature control means arranged in accordance with this invention to control the temperature of the oven provided for the range; Fig. 2 is a fragmentary vertical sectional view of a temperature control device arranged in accordance with this invention and used in the range of Fig. 1; Fig. 3 is a fragmentary view mainly in section and similar to Fig. 2, but illustrating certain parts of the mechanism in different operative positions than they occupy in Fig. 2; Fig. 4 is an end view in elevation of the temperature control device of Figs. 2 and 3, portions being removed so as to illustrate certain details of construction; and Fig. 5 is a fragmentary sectional view taken on an enlarged scale illustrating a controlling switch used in the temperature control device of Figs. 2, 3, and 4.

Referring to the drawing, this invention has been illustrated in connection with an electric range, but it is to be understood that the control device has general application and may be used to control various other heated or cooled devices, such as frying kettles, griddles, refrigerators and various other electric heated or cooled devices wherein it is desirable to hold a substantially constant preselected temperature. In addition, it is to be understood that this invention is not limited in its application to electrically heated devices, but may be used to control the flow of fuel to gas burners, and the like.

As shown in Fig. 1, the electric range 10 comprises an oven 11, and an area 12 for supporting a plurality of surface heating units. The surface heating units (not shown) are controlled by means of switches 13 mounted on switch panel 13a, while the heating elements (not shown) for the oven are controlled by means of a suitable temperature control device 14 arranged in accordance with this invention.

The temperature control device is of the bulb and bellows type. That is, it utilizes the movement of a bellows to operate an electric switch for controlling the heating circuit of the oven unit, and a bulb, which is located in the medium whose temperature is to be controlled, in this case, in the oven 11. As shown, a bellows assembly 15 is connected into a closed system with a bulb 16 by means of a flexible tube 17. The bellows assembly 15 comprises a metallic expansible and contractible bellows 16a, mounted within a cup-shaped chamber 18. At the closed end of the chamber, there is provided a nipple 19 sealed into the wall of the chamber and having a liquid-tight seal with the tube 17. At the opposite end of the chamber 18, that is, at the mouth of the chamber, there is provided an annular plate 19a having its outer edge sealed to the chamber. The bellows 16a, as shown, is closed at its end adjacent the closed end of the chamber 18, while its opposite end is open. The walls at this opposite end are secured to the annular plate 19a with a liquid-tight seal in any suitable manner, as by soldering.

A suitable thermal liquid 20, having a relatively high coefficient of expansion and the property of retaining its liquidity throughout normal working temperatures in the oven, completely fills the space within the chamber 18 between the walls of the chamber and the bellows 16a, and also completely fills the bulb 16, and the tube 17 connecting the bulb with the bellows motor into a closed fluid system. It will be understood that expansion and contraction of the fluid in the closed system responsively to the temperature of the bulb 16 in the oven will control the movement of the bellows; this movement in turn is utilized to operate the switch.

A stud 21 is arranged within the bellows 16a with its axis substantially coinciding with the axis of the bellows and having its inner end resting against the closed end of the bellows in a suitable depression provided for it in the bellows, as shown in Fig. 2. The stud 21 projects from the opposite end of the bellows through the annular plate 19a.

The bellows assembly, including the bellows and its chamber, the stud 21 and the spring 25 are mounted upon a suitable supporting base 22, which, as shown, is provided with upright bosses 23 on its side adjacent the bellows chamber and which function to support the bellows assembly. As shown, the housing 18 for the bellows assembly is mounted on the studs and secured thereto by means of screw fastening means 24.

Movement of the bellows inwardly in response to an increase in temperature of the oven, that is, in response to an expansion of the fluid 20 is resisted by a loading spring 25 which is of the compression type and which is arranged around the stud 21, one end of the compression spring bearing against the inner end of the stud, as shown, and the opposite end resting on the adjacent surface of the support 22. Preferably and as shown, the support will be provided with an upright cylindrical wall 26 surrounding the lower portion of the spring.

The outer end of the stud 21 is provided with two parallel flat surfaces, which will allow the stud to have a free sliding motion in the aperture 27, but prevent it from turning.

This outer end of the stud is provided with an internal threaded bore 28 in which is threaded a shaft or bar 29. As shown, the bar 29 is arranged in axial alignment with the stud 21 and on its end adjacent the stud is provided with an enlarged threaded head 30 which is received in the threaded bore 28 of the stud. The opposite end of the rod 29 is received to rotate with the bushing 31 and to slide longitudinally relatively thereto by means of a splined connection 32. The bushing 31 is mounted in a suitable supporting member 33, which as shown is provided with an aperture 34 therethrough for receiving the bushing. The supporting member 33 in turn is mounted upon the base 22, which is provided with relatively long protuberances or shoulders 35 positioned opposite each other at the sides and on the face of the base opposite the bellows motor, as clearly shown in the drawing. The supporting block 33 is secured to these shoulders by means of screw fastening means 36 received in threaded apertures 35a provided for them in the shoulders 35. Preferably, a suitable casing 37 will be provided on the base 22. This is also secured to the shoulders 35 by means of screw fastening means 37a received in threaded apertures 35b provided for them in the shoulders. The support 33 is formed of a suitable electrically insulating material, such as a phenol condensation product.

The bushing 31 on its outer end is provided with a shoulder 38 beneath which is positioned a spring washer 39. The inner end of the bushing is secured against outward displacement by the spring washer by means of a U-shaped locking member 40, the two legs of which are received in a recess 41 provided for them in the inner end of the bushing.

Mounted upon the shaft 29 adjacent its enlarged inner end 30 is an abutment or shoulder 42. This abutment is used to control the operation of a suitable control device as it is moved longitudinally by the operation of the bellows motor 15. The control device in this case is an electric switch comprising a pair of fixed contacts 43 with which a movable bridging contact 44 co-operates. The fixed contacts 43 are of stud-like form and are received in apertures 45 provided for them in the supporting member 33 so that their inner ends project into the casing 37. These contacts 43 are provided with knurled exterior surfaces, as shown in Fig. 5, so as to have a tight fit with the supporting block 33. Suitable binding screws 46 on the exterior of the casing are threaded into the contact members 43.

The bridging contact 44 is carried by means of a suitable switch or controlling arm 47. This contact is electrically insulated from the arm by a sheet of insulating material 47a interposed between these members. The controlling arm 47 is mounted upon a suitable supporting member 48, generally in parallel relation with the base 22 and extending through the line of movement of the shaft 29. The arm 47 has an elongated aperture 47b through which the shaft is directed. The supporting member 48, as shown, is of right angle form, to one arm of which the switch arm 47 is rigidly secured, as by means of rivets 49. Attached to this arm of the support 48 are suitable bearings 50 which receive a supporting shaft 51. This shaft in turn is supported by means of bearings 52 provided on the base 22. The shaft 51 constitutes a pivotal support for the switch arm 47. Bearing on the other arm of the support 48 is a compression spring 53. This spring has one end bearing against an abutment 53a provided for it on the base 22 and its other end bearing on the arm of the support, and is supported, as shown, in substantially parallel relation with the switch arm. The compression spring 53, it will be observed, applies a force to the switch arm to move it in a clockwise direction, as viewed in Figs. 2 and 3, that is, to move it in a direction to open the switch contacts 43.

Movement of the switch arm 47 to open the switch under the influence of the spring 53 is resisted by the abutment 42 on the rod 29. For this purpose, a suitable lever 54 is interposed between the abutment and the switch arm 47. The lever 54, as shown, is pivotally supported intermediate its ends on a suitable pin or shaft 55, which in turn is mounted in bearing members 56 provided for it on the base 22. The end of the lever 54 adjacent the shaft 29 is provided with a pair of arms 54a (Fig. 4) arranged on opposite sides of the shaft and which are joined by means of a cross arm 54b in which is placed a U-shaped slot or recess 54c. The shaft 29 is received in this recess and the recess is arranged so that the walls of the cross member 54b on opposite sides of the recess rest upon the abutment 42. On the opposite side of the pivot is a single arm 54d which rests upon a suitable pin or abutment 57 provided on the support 48.

It will be observed in view of the foregoing construction that the abutment 42 resists movement of the switch arm to open the switch by the spring 53, and also that the movement of the switch between its open and closed positions will be controlled by the movement of the shaft 29. The movement of this shaft 29 in turn is controlled by the operation of the expansible motor 15 so that the operation of the switch is controlled by the operation of the expansible motor. It will also be observed that when the temperature of the liquid 20 in the bulb 16 increases so that it expands, the stud 21 will be moved inwardly, which operation will move the abutment 42 inwardly. This operation permits the support 48 to be moved in a clockwise direction under the influence of the spring 53 so as to move the switch arm 47 in a switch opening direction. Conversely, when the liquid in the bulb cools and contracts, the loading spring 25 of the expansible motor will move the stud 21 and shaft 29 toward the left, which operation will move the lever 54 to operate the support 48 in a counterclockwise direction, that is, in a direction to move the switch arm 47 in a switch closing direction.

Temperature adjustment of the control device is effected by controlling the position of the abutment 42 relative to the expansible motor 15. This is accomplished by turning the shaft 29 inwardly or outwardly relative to the stud 21. In order that this can be accomplished, conveniently, an adjusting knob 58 is provided. The knob 58 is secured to a shaft 59 which is mounted within the bushing 31, as clearly shown in Fig. 2. The shaft 59 has a splined connection 60 with the bushing so that when the knob 58 is rotated, the shaft 59 and also the shaft 29 will be adjusted. The shaft 59 is secured to the bushing 31 to prevent relative sliding movement between these members by means of a collar 61 bearing on a shoulder 62 provided on the shaft and which engages the bushing. The collar 61 in turn is secured to a collar 63, which is secured to the outer end of the bushing 31. In order to assist in setting the temperature of the control device, a suitable index 64 is provided to co-operate with a temperature scale 65 provided on the adjusting knob 58. The index 64 is secured to the supporting member 33.

In order to cause the switch arm 47 to move quickly with a snap action between its controlling positions, a suitable U-shaped snap action spring 66 is provided. The spring 66, as shown, has one arm bearing on the movable end of the switch arm 47 and its other arm bearing on a fixed pivot 67 mounted opposite the movable end of the switch arm. The fixed pivot 67 is mounted in a supporting plate 68 which in turn is slidably mounted in guideways 69 provided for it in an upright wall 70 arranged on the base 22. As shown the bearing 67 is mounted upon a threaded stud, the outer end of which is threaded into the plate 68 and on the outer end of which is secured a nut 71 bearing on a washer 72 interposed between the nut and the wall 70. The position of the bearing 67 relative to the base 22, therefore, can be adjusted. This adjustment is a factory adjustment and is provided for the purpose of initially setting the center line of operation so that the switch opens and closes with good snap action. An upper threaded stop 73 is provided for the plate 68. A similar stop 73a is provided for the open circuit position of the blade 47.

The relation of the U-shaped spring member 66 to the switch arm 47 is substantially the same as that described in the patent to A. H. Simmons No. 1,743,073, dated January 7, 1930, and its action is substantially the same as described in detail in this patent.

In the operation of the control device thus far described, it will be understood that the base 22 will be located in any suitable position, such as on the switch panel 13a of the range, and as indicated in dotted lines in Fig. 1. The bulb 16 will be located at some suitable position within the oven, the tube 17 being flexible to facilitate the positioning of the bulb 16 and the supporting plate 22. The temperature to be held by the control device will be adjusted by the knob 58 and as long as the temperature within the oven is below the temperature for which the device is adjusted, the switch arm 47 will be in its position shown in Fig. 2 to close the circuit through the switch, whereby the heating circuit for the oven will be energized. As the temperature of the oven increases, the temperature of the fluid 20 within the bulb 16 will expand. As the fluid expands, it will operate the bellows 16a to move the stud 21 toward the right, as viewed in Figs. 2 and 3. This operation, as pointed out previously, will move the abutment 42 toward the right to permit the support 48 to move in a clockwise direction under the influence of the spring 53. Eventually, when the oven attains a predetermined maximum temperature, the fluid 20 will have expanded sufficiently to permit the spring 53 to open the switch contact 43 and thereby open the heating circuit of the oven. The heating circuit will remain open until the oven cools sufficiently to permit the fluid 20 to contract to such an extent that the loading spring 25 will have moved the abutment 42 sufficiently to return the switch to its closed position against the bias of the spring 53. In each case, the U-shaped spring 66 functions to move the control arm with a snap action. In this manner, the control device maintains a predetermined temperature which is the mean between the maximum and minimum temperatures at which the switch is opened and closed.

In certain applications, such as in an electric range, it is quite possible that the ambient temperature of the expansible motor 15 will be considerably higher than room temperature. Thus, when the base 22 is located in the switch panel 13a, the motor 15 will be subjected to heat transmitted from the surface heating plates and also from the oven 11. This localized heating of the motor 15 causes that portion of the liquid 20 within the chamber 18 to expand, and unless this expansion of the liquid were otherwise compensated for, it would cause the switch to open sooner than it should. In other words, it would cause the oven heating unit to cease to apply heat to the oven before the oven is heated to the desired temperature. In order to compensate for this, the switch arm 47 itself is made to function as a thermostat responsive to ambient temperature. As shown, the switch arm 47 is formed as a bimetal bar made of two suitable strips of metal having dissimilar temperature coefficients of expansion, the two strips being securely welded together lengthwise. The strips may be formed of nickelchrome steels of the proper compositions. The bimetal element is so arranged that when the ambient temperature increases, and thus the fluid 20 in the chamber 18 expands, the bimetal bar 47 will curve toward the right, as viewed in Fig. 2, so as to press the switch contacts together with a greater force. Thus when the ambient temperature increases, the bellows moves the abutment 42 toward the right and at the same time the thermostatic element 47 itself curves toward the right to compensate for the movement of the abutment. Conversely, when the ambient temperature decreases, the abutment 42 will move toward the left and the thermostatic element 47 also will curve somewhat toward the left to compensate for this movement of the abutment.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States is:

1. A temperature control device comprising a rod, a temperature responsive element for moving said rod, a lever controlled by movement of said rod, a control arm, a shaft, means mounting said control arm on said shaft for free pivotal movement thereon, an operable connection between said control arm and lever so that the control arm is operated in one direction on said shaft by movement of said lever when said rod moves in one direction and a spring connected to said control arm to apply a force to it to move said arm on said shaft in the opposite direction when the movement of said rod reverses.

2. A temperature control device comprising a temperature responsive element, a member movable longitudinally in opposite directions by said temperature responsive element, a thermostatic control arm responsive to ambient temperature changes, means mounting said control arm for free pivotal movement between a pair of controlling positions, a spring bearing on said control arm so as to resist pivotal movement thereof continuously from one to the other of said positions, a lever, connections between said lever and said control arm and longitudinally movable member arranged to move said control arm from said one to the other of said positions against the force of said spring when said member moves in one direction and when said member moves in the opposite direction to release said control arm for return movement to said one position by said spring.

3. A temperature control device comprising a temperature responsive element, a rod movable longitudinally in opposite directions by said temperature responsive element, a control arm, means pivotally mounting said control arm for movement between a pair of controlling positions, a spring bearing on said control arm so as to resist movement thereof continuously from one to the other of said positions, a lever, means pivotally mounting said lever between its ends, an abutment on said rod, a bearing on one end of said lever resting on said abutment, a second abutment carried by said control arm and a second bearing on the other end of said lever resting on said second abutment so that said lever holds said control arm in said other position against the force of said spring when said rod is in one position and when said rod moves in one direction from said position moves to permit said spring to move said control arm to said one position, said rod when moved in the opposite direction operating said lever to force said control arm to said other position against the force of said spring.

4. A temperature control device comprising a switch arm, a pivot bearing for said switch arm mounting said switch arm for movement between a pair of controlling positions, an abutment on said switch arm on one side of said pivot, a longitudinally movable rod provided with an abutment, a temperature responsive device for moving said rod longitudinally, a lever interposed between said rod and said switch arm having a portion bearing on said abutment on said rod and a portion bearing on said abutment on said switch arm, a spring bearing on said switch arm on the side of said pivot opposite said bearing biasing said switch arm toward one of said controlling positions and forcing said lever against the abutment on said rod, said lever operating to release said switch arm for movement to said one position by said spring when said rod is moved in one direction and to move said switch arm to said other controlling position against the force of said spring when said rod is moved in the opposite direction.

5. A temperature control device comprising a support of substantially right angle form, a pivot mounting said support for pivotal movement on an axis adjacent one of the arms of said support, a switch arm mounted on said one arm, a spring bearing on the other arm of said support and biasing said switch arm in one direction, a pivoted lever having one arm bearing on said one arm of said support, a longitudinally movable rod having an abutment thereon against which the other arm of said lever rests, a temperature control device for operating said rod in opposite directions and means for adjusting the position of said rod abutment relative to said temperature control device.

6. A temperature control device comprising a support, a pivot mounting said support for pivotal movement, a switch arm mounted on said support on one side of said pivot, a spring bearing on said support on the other side of said pivot and biasing said switch arm in one direction, a pivoted lever having one arm bearing on said support on said one side of said pivot, a longitudinally movable rod having an abutment thereon against which the other arm of said lever rests, and a temperature control device for operating said rod in opposite directions.

7. A temperature control device comprising a support, means pivotally mounting said support, a switch arm carried by said support for pivotal movement in a predetermined plane between controlling positions, a spring acting on said support biasing said switch arm to one of said controlling positions, a rod mounted for reciprocatory motion, an abutment on said rod, a lever between said rod and said support bearing on said abutment and on said support so that said rod resists movement of said switch arm to said one controlling position and controls movement of said switch arm between said controlling positions by movement of said rod, and a temperature responsive device controlling the movement of said rod.

8. A temperature control device comprising a temperature responsive element, a member movable longitudinally in opposite directions by said temperature responsive element, a control arm, means mounting said control arm for movement between a plurality of controlling positions, a spring connected directly to said control arm so as to resist movement thereof continuously from one to the other of said positions, a lever, mechanical connections between said lever and said control arm and longitudinally movable member arranged to move said control arm from said one to the other of said positions against the force of said spring when said member moves in one direction and when said member moves in the opposite direction to release said control arm for return movement to said one position by said spring.

9. A temperature control device comprising a shaft, a switch member pivotally mounted on said shaft, a spring cooperating with said switch member biasing it in one direction, a lever pivotally mounted intermediate its ends having one end bearing on said switch arm and a temperature responsive device acting on the other end of said lever to move said lever in a direction to operate said switch arm against the force of said spring upon a predetermined change in temperature to a predetermined degree and to permit said spring to move said switch arm and lever reversely when the temperature changes in the reverse direction to a predetermined degree.

10. A temperature control device comprising a support, means pivotally mounting said support, a switch arm carried by said support for pivotal movement in a predetermined plane between controlling positions, a spring acting on said support biasing said switch arm to one of said controlling positions, a rod mounted to reciprocate in the plane of movement of said switch arm directed through an aperture provided for it in said switch arm, an abutment on said rod, a lever between said rod and said support bearing on said abutment and on said support so that said rod resists movement of said switch arm to said one controlling position and controls movement of said switch arm between said controlling positions by movement of said rod, and a temperature responsive device controlling the movement of said rod.

11. A temperature control device comprising a support of substantially right angle form, a pivot supporting said support, a switch arm mounted on one arm of said support for movement in a predetermined plane between controlling positions, a spring arranged in substantially parallel relation to said switch arm bearing on the other arm of said support biasing said switch arm toward one of said controlling positions, a rod arranged substantially at right angles to said switch arm directed through an aperture provided for it in said switch arm and mounted for reciprocatory movement, an abutment carried by said rod, a lever, a pivot support for said lever between said rod and said pivot for said support, said lever having one end bearing on said abutment and its other end bearing on an abutment provided for it in said support, a bellows for operating said rod in one direction, a spring resisting movement of said rod in said one direction, a thermostatic fluid controlling the operation of said bellows responsively to changes in temperature, and means for adjusting the position of said abutment on said rod relatively to said bellows.

12. A temperature control device comprising a support of substantially right angle form, a pivot supporting said support, a switch arm mounted on one arm of said support for movement in a predetermined plane between controlling positions, a spring arranged substantially parallel to said switch arm bearing on the other arm of said support biasing said switch arm toward one of said controlling positions, a rod arranged substantially at right angles to said switch arm directed through an aperture provided for it in said switch arm and mounted for reciprocatory movement, an abutment carried by said rod, a lever, a pivot support for said lever between said rod and said pivot for said support, said lever having one end bearing on said abutment and its other end bearing on an abutment provided for it in said support, a bellows for operating said rod in one direction, a spring resisting movement of said rod in said one direction, a thermostatic fluid controlling the operation of said bellows responsively to changes in temperature, means for adjusting the position of said abutment on said rod relatively to said bellows, and a snap action spring acting on said switch arm to cause it to move quickly between said controlling positions.

13. A temperature control device comprising a switch arm mounted for movement between controlling positions, a snap action spring acting on said switch arm to move it quickly between said controlling positions, a second spring acting on said switch arm constantly resisting movement thereof from one controlling position to another controlling position, a movable member operably associated with said switch arm to apply a force to move it to said other controlling position against the force of said spring, a bellows for moving said member to effect movement of said switch arm to said other controlling position, and a third spring resisting movement of said bellows to effect said movement of said member.

14. A temperature control device for an oven and the like comprising a control arm, means pivotally mounting said arm for operation between a pair of controlling positions to turn the heat on and off, a spring bearing on said control arm continuously applying a force tending to move it toward one of said controlling positions to shut off the heat, a temperature responsive element, and a lever connecting said temperature responsive element to said control arm arranged when said temperature responsive element attains a predetermined high temperature to permit said spring to apply a force to move said control arm to shut off the heat, and to apply a positive force to said control arm by said temperature responsive element to reapply the heat when the temperature of said temperature responsive element falls to a predetermined low value.

15. An oven temperature control device comprising a rod, a device responsive to the temperature of said oven arranged to control the movement of said rod, a lever controlled by movement of said rod, a shaft, a bimetallic control arm pivotally mounted on said shaft for movement between controlling positions and moved to one of said positions by said lever when said rod moves in one direction, and a spring acting on said control arm for moving it to the other of said positions when the movement of said rod reverses, said bimetallic control arm responding to temperature changes so as to compensate for ambient temperature.

16. A temperature control device comprising a control arm mounted for movement between controlling positions, a spring for moving said arm to one of said positions, a reciprocating member, an abutment on said member, a thermostatic device controlling the movement of said member, a lever resting on said abutment and acting on said control arm to move it away from said controlling position against the force of said spring when said reciprocating member is moved in one direction, said member having a threaded connection with said thermostatic member, and means for rotating said member to vary the position of said abutment.

17. A temperature control device comprising a control arm mounted for movement between controlling positions, a spring for moving said arm to one of said positions, a bulb and bellows temperature responsive device, a shaft having a threaded connection with said bellows, an abutment fixed to said shaft, a control knob for turning said shaft to vary the position of said abutment relative to said bellows, and a lever resting on said abutment and acting on said control arm to move it away from said controlling position to another controlling position against the force of said spring when said shaft is moved in one direction by said bellows.

NICHOLAS MILLER.
RUSSELL A. WINBORNE.